UNITED STATES PATENT OFFICE

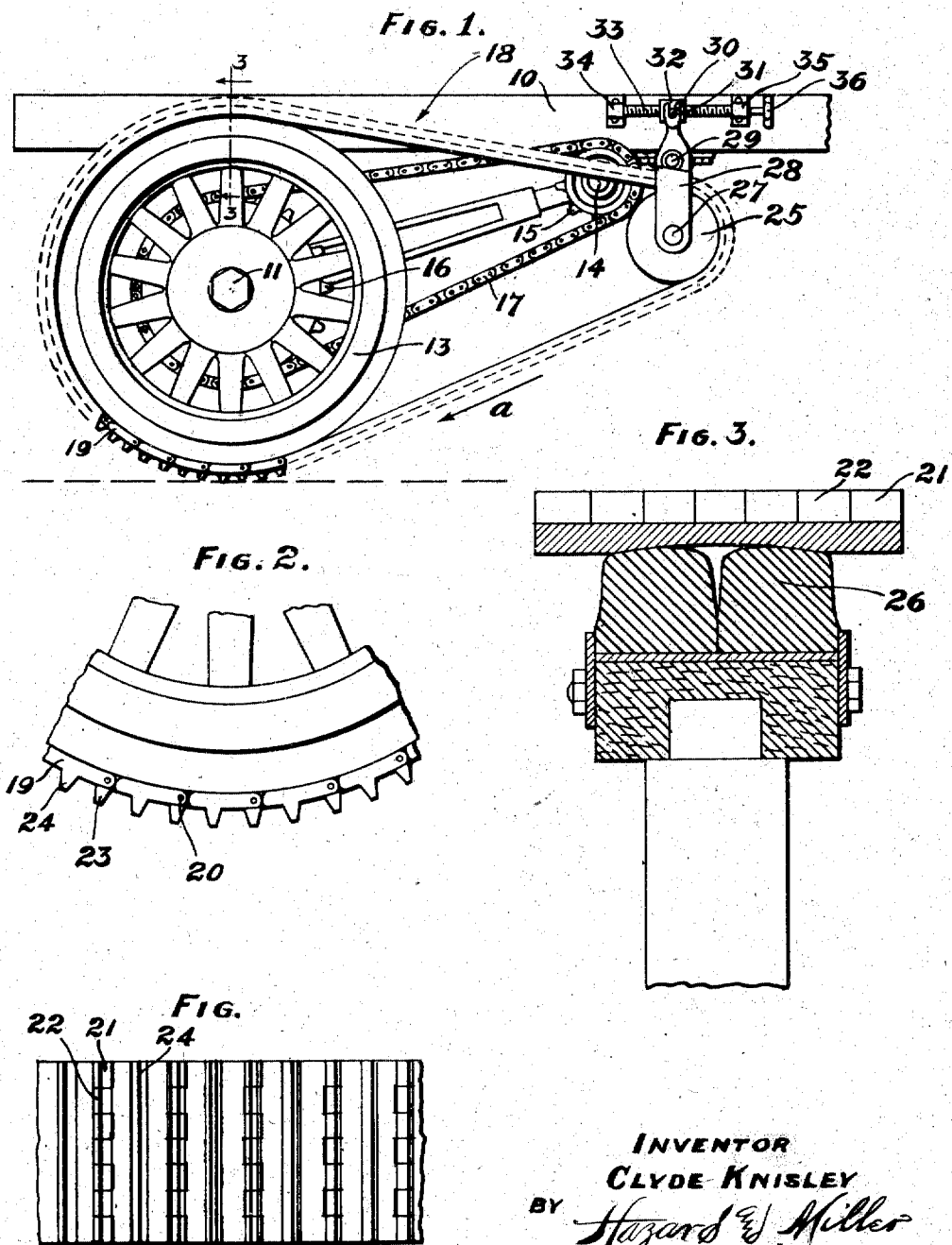

CLYDE KNISLEY, OF LA HABRA, CALIFORNIA.

TRACTOR-TREAD.

1,280,044.   Specification of Letters Patent.   Patented Sept. 24, 1918.

Application filed September 4, 1917. Serial No. 189,627.

*To all whom it may concern:*

Be it known that I, CLYDE KNISLEY, a citizen of the United States, residing at La Habra, in the county of Orange and State of California, have invented new and useful Improvements in Tractor-Treads, of which the following is a specification.

This invention relates to a tractor tread for motor vehicles.

The principal object of this invention is to provide a removable tractor tread which may be mounted upon cushion tires of common construction and will provide them with increased traction.

Another object of this invention is to provide auxiliary traction treads which may be easily placed in operative position and may be used without excessive wear.

Other objects will appear hereinafter.

The invention is illustrated, by way of example, in the accompanying drawings in which:

Figure 1 is a fragmentary view in side elevation illustrating a portion of a vehicle frame and particularly disclosing the rear driving axle thereof as fitted with the traction tread with which the present invention is concerned.

Fig. 2 is a fragmentry view illustrating the manner in which the tread conforms to the contour of the wheels.

Fig. 3 is a view in section, as seen on the line 3—3 of Fig. 1, illustrating the longitudinal sectional formation of the tread members.

Fig. 4 is a fragmentary view in plan illustrating the face formation of the tread and particularly disclosing the manner in which the tread links interlock.

Referring more particularly to the drawings, 10 indicates a vehicle frame, beneath the rear end of which is mounted a rear axle 11 upon which wheels 13 are disposed. In the present instance these wheels are freely mounted upon the axle and are driven from the jackshaft 14 which is provided with a driving sprocket 15 in connection with a wheel sprocket 16. The sprockets are fitted with a driving chain 17. It will be understood, however, that the manner in which the wheels are driven is an immaterial feature and that the present invention is concerned with a traction tread 18 detachably mounted over the wheels.

The tread belt 18 consists of a series of hinged flights 19 which are pivotally connected with each other by pivot pins 20. The adjacent ends of the flights are formed with intermeshing pin blocks 21 and 22 through which the pins 20 extend. Cleats 23 are formed upon the back of each pin block and extend outwardly therefrom. These segments are designed to combine and form a continuous cleat surface across the flight when the tread is around the wheel. Interposed between the cleats 23 are continuous cleats 24 which extend parallel to the cleats 23 and midway the distance therebetween. The tread is formed of a sufficient number of these cleats to produce a belt which is led around an idler pulley 25.

Reference being had to Figs. 2 and 3, it will be seen that the inner faces of the flights are concaved longitudinally and laterally, in this manner providing a seat for the tires 26 of the wheel and also allowing the flights to conform circumferentially to the tire. The idler pulley 25 is, of course, formed with a convexed face over which the tread runs.

It is desirable to adjustably tension the tread upon the wheels and thereby control the frictional engagement of the tires 26 with the tread. As here shown, this is accomplished by movement of the pulley idlers 25 in relation to the wheels. The axle 27 of the pulley 25 is secured to the fork of a lever 28 which, in turn, is connected by pivot pin 29 to the frame of the vehicle. The upper end of the lever 28 is bifurcated to form a fork 30 between the arms of which a pin 31 extends. This pin is mounted upon a movable block 32 having a threaded central bore through which an adjusting screw 33 extends. The screw is mounted to rotate within bearings 34 and 35 upon the frame of the vehicle and may be actuated by a hand grip 36 secured at one end thereof.

In operation, the treads may be rolled up and placed out of the way until additional traction effort of the vehicle is required. At that time the tread may be unrolled and placed around the periphery of both the rear wheels 13 and the idler pulleys 25. The adjusting screws 33 may then be actuated to draw the tread belts tight, after which the vehicle may be driven. During the driving of the vehicle, the frictional engagement of the wheels 13 with the inner surfaces of the flights will cause the tread to move in the direction indicated by the arrow —*a*— in Fig. 1. It may be understood that the flights are considerably wider than the tires upon which they are mounted and will therefore provide an increased traction surface, the action of which is facilitated by the cleats 23 and 24.

It will thus be seen that the tread here disclosed is simple and durable in its construction and may be optionally used in connection with motor vehicles without damage to the parts upon which it is mounted.

While I have shown the preferred construction of my tractor tread as now known to me, it will be understood that various changes in the combination, construction and arrangement of parts may be made by those skilled in the art without departing from the spirit of the invention as claimed.

I claim:

The combination with an automobile having a drive wheel, of a tractor tread belt adapted to run upon the drive wheel, an idler pulley in line with the drive wheel; the tractor tread belt also running around the idler pulley; an axle supporting the idler pulley, a lever supporting the axle having a fork at each end, a pivot pin supporting the lever, a pin in the upper fork, a block supporting the pin and having a screw-threaded central bore, an adjusting screw in the bore of the block, and bearings rigidly mounted upon the automobile frame and supporting the adjusting screw; so that by manipulating the adjusting screw the tension of the idler upon the tractor tread belt may be regulated.

In testimony whereof I have signed my name to this specification.

CLYDE KNISLEY.